United States Patent
Hidaka et al.

(10) Patent No.: US 9,062,958 B2
(45) Date of Patent: Jun. 23, 2015

(54) IMAGE SENSOR, ATTITUDE DETECTOR, CONTACT PROBE, AND MULTI-SENSING PROBE

(71) Applicant: MITUTOYO CORPORATION, Kawasaki-shi, Kanagawa (JP)

(72) Inventors: Kazuhiko Hidaka, Kawasaki (JP); Nobuhiro Ishikawa, Tsukuba (JP)

(73) Assignee: MITUTOYO CORPORATION, Kawasaki-Shi (JP)

(*) Notice: Subject to any disclaimer, the term of this patent is extended or adjusted under 35 U.S.C. 154(b) by 126 days.

(21) Appl. No.: 13/733,434

(22) Filed: Jan. 3, 2013

(65) Prior Publication Data

US 2013/0176575 A1    Jul. 11, 2013

(30) Foreign Application Priority Data

Jan. 6, 2012  (JP) .................................. 2012-001412

(51) Int. Cl.
| | |
|---|---|
| *G01B 11/02* | (2006.01) |
| *G01B 11/24* | (2006.01) |
| *G01B 9/02* | (2006.01) |
| *G01B 5/012* | (2006.01) |
| *G01B 11/27* | (2006.01) |
| *G01B 11/00* | (2006.01) |

(52) U.S. Cl.
CPC ............ *G01B 9/02041* (2013.01); *G01B 5/012* (2013.01); *G01B 11/272* (2013.01); *G01B 11/007* (2013.01)

(58) Field of Classification Search
CPC ............ G01B 9/02041; G01B 11/007; G01B 11/272; G01B 5/012; G01B 11/25; G01B 11/254; H01L 27/14825
USPC ......................................... 356/508, 510, 604
See application file for complete search history.

(56) References Cited

U.S. PATENT DOCUMENTS

| | | | | |
|---|---|---|---|---|
| 6,044,569 | A  * | 4/2000 | Ogihara et al. ................. | 33/503 |
| 7,315,383 | B1 * | 1/2008 | Abdollahi ...................... | 356/601 |
| 2002/0113973 | A1 | 8/2002 | Ge | |
| 2007/0206204 | A1* | 9/2007 | Jia et al. ........................ | 356/604 |
| 2010/0067021 | A1 | 3/2010 | Danzebrink et al. | |

FOREIGN PATENT DOCUMENTS

| | | |
|---|---|---|
| EP | 2163906 | 3/2010 |
| JP | 08-201034 | 8/1996 |
| JP | 2008-096295 | 4/2008 |

OTHER PUBLICATIONS

Extended European Search Report issued on Apr. 10, 2013 filed in European application No. 13150012.6.

* cited by examiner

*Primary Examiner* — Michael A Lyons
(74) *Attorney, Agent, or Firm* — Rankin, Hill & Clark LLP (57) ABSTRACT

A line image sensor including a light receiving plane on which two or more straight rows of pixels are disposed, the straight rows of pixels capturing images of regular fringes generated from light reflected from an irradiated body in accordance with the amount of light received by each pixel; at least two rows of pixels acquiring images of linear fringes crossing at right angles in two directions among the fringe projected onto the light receiving plane.

9 Claims, 7 Drawing Sheets

IMAGE SENSOR, ATTITUDE DETECTOR, CONTACT PROBE, AND MULTI-SENSING PROBE

CROSS-REFERENCE TO RELATED APPLICATIONS

This application is based on and claims the benefits of priority from Japanese Patent Application No. 2012-001412, filed on Jan. 6, 2012, the entire contents of which are incorporated herein by reference.

BACKGROUND OF THE INVENTION

1. Field of the Invention

The present invention relates to image sensors for capturing images of fringes, and more specifically, to an image sensor that can be configured more easily than the conventional sensors and can perform high-speed detection. The present invention also relates to attitude detectors for detecting the attitude of an irradiated body by using the image sensor. The present invention further relates to contact probes and multi-sensing probes using the attitude detector.

2. Description of the Related Art

A conventional attitude detector for optically detecting the attitude of an irradiated body uses an interferometer to generate interference fringes and detects images of the fringes by using an imaging element (image sensor).

Attitude Detector

One general attitude detector using a Michelson interferometer will be described. A beam splitter splits laser light emitted from a laser light source into a reference beam and a measurement beam. The reference beam hits a reference mirror, and the measurement beam hits a reflecting surface formed on the irradiated body. The beam splitter recombines the beams reflected from the reference mirror and the irradiated body to cause interference. The resulting interference fringes are captured by an image sensor. When the attitude of the irradiated body changes, the corresponding change appears in the captured image of the interference fringes. By detecting the change in the fringe image, the change in the attitude of the irradiated body can be determined.

Image Sensor

As the image sensor used in the conventional attitude detector, a position sensor device (PSD) or an area image sensor is generally used to capture two-dimensional images such as interference fringe images.

Although it allows high-speed detection, the PSD detects the centroid value of the amount of light. The PSD is suitable for detecting light in spots but is not suitable for detecting fringes such as interference fringes. Because of its limited ability to detect the attitude (translation or rotation) of the reflecting surface of the irradiated body, complicated signal processing needs to be performed.

The area image sensor has many pixels (light receiving elements) arranged two-dimensionally on a light receiving plane and is formed of a charge-coupled device (CCD) or a complementary metal-oxide semiconductor (CMOS). Since each pixel can detect the amount of light received, this sensor is suitable for detecting fringe images and is sufficiently capable of detecting the attitude of the reflecting surface of the irradiated body. The CMOS type is capable of performing faster detection than the CCD type. Area image sensors capable of even faster detection for high-speed cameras have come into the market in recent years. Nevertheless, the detection speed of any area image sensor is far slower than that of a PSD.

Disclosed in Patent Literature 1 is a contact probe for detecting the attitude of a movable body (stylus) based on values detected in interference fringe detection performed by using one straight row of pixels (line image sensor) to improve the interference fringe detection speed.

The line image sensor is capable of performing high-speed detection generally at a sampling frequency (frame rate) of several tens of kilohertz. By using the line image sensor, the response of the attitude detector can be improved. The detection speed is about 1000 times higher than the sampling frequency of the CCD, which is a representative example of the area image sensor, and is also significantly higher than that of the PSD. Therefore, the attitude detector using the line image sensor disclosed in Patent Literature 1 can realize a highly functional detector with high resolution, high stability, fast response, and the like.

Patent Literature

Patent Literature 1: Japanese Unexamined Patent Application Publication No. 2008-96295

SUMMARY OF THE INVENTION

Although the contact probe disclosed in Patent Literature 1 enables fast response and the like, a complicated optical system must be set up on the optical path between the interferometer and the line image sensor. The optical system is required to split the interference fringes generated by the interferometer, to bring one split part of the interference fringes into the right half of the horizontally disposed line image sensor, and to turn the other split part of the interference fringes by 90 degrees about the optical axis and then bring it into the left half of the line image sensor.

The present invention is provided to solve the problems described above, and a first object thereof is to provide an image sensor for fringe images of interference fringes and the like in which the optical system has a simpler configuration than that of the conventional line image sensor, and faster detection becomes possible.

A second object is to provide an attitude detector having high functionality, such as high resolution, high stability, and fast response, for detecting the attitude of an irradiated body, by using the image sensor to detect fringes resulting from light reflected from the reflecting surface formed on the irradiated body.

A third object is to provide a contact probe for three-dimensional measurement, incorporating the attitude detector as an internal sensor, and a multi-sensing probe.

Image Sensor

An image sensor according to the present invention includes a light receiving plane on which two or more straight rows of pixels are disposed, and the image sensor captures images of regular fringes generated from light reflected from an irradiated body in accordance with the amount of light received by each pixel. Among the rows of pixels, at least two rows of pixels are disposed at right angles to each other and acquire images of linear fringes crossing almost at right angles in two directions among the fringe projected onto the light receiving plane.

Similarity between the image sensor (imaging element) of the present invention and the conventional area image sensor such as a CCD is that fringes are projected onto the light receiving plane. Whereas the conventional area image sensor captures fringes as an almost complete two-dimensional image, the image sensor of the present invention acquires fragmental images of orthogonal linear fringes in two directions. When an image of interference fringes or a regular fringe pattern is captured, for example, a change in those fringes can be estimated from fragmental information, without detailed information of the entire fringes, and a change in position or attitude of the irradiated body can be detected on the basis of the estimated change in fringes. The number of bright parts (or dark parts) included in linear fringes, their positions, and other fragmental information can be effective information in the image sensor. By using the image sensor only for capturing images of regular fringes (actually acquiring linear images of parts of fringes), the image sensor can perform processing more quickly than the conventional image sensor.

The inventors have found that by disposing at least two rows of pixels in the vertical and horizontal directions for a single fringe, a change in the fringe can be detected more accurately than by disposing a row of pixels in a single direction. A first row of pixels estimates the entire image of a fringe by connecting a bright part of a linear fringe with another bright part in a second row of pixels, orthogonal to the first row of pixels, thereby detecting a change in the fringe accurately. If the two rows of pixels cross each other, a common pixel is present at the intersection. If the two rows of pixels do not cross each other, each row of pixels include a pixel close to another row of pixels. Through image processing based on the information from the common pixel or close pixels of the two rows of pixels, the bright parts (or dark parts) can be connected easily and accurately.

In Patent Literature 1, a line image sensor is used to acquire information of orthogonal linear fringes in two directions from interference images. To capture the orthogonal linear fringes in the two directions by a single row of pixels, the interference fringes are split. One split part is projected directly onto one half of the row of pixels, and the other split part is rotated about the optical axis by 90 degrees and then projected onto the other half of the row of pixels. The single row of pixels can capture images of linear fringes in two directions, but a complicated optical configuration must be placed between the interferometer and the sensor. The image sensor of the present invention, however, does not need to split the fringe. One image sensor receives light of one fringe directly, and a vertical row of pixels and a horizontal row of pixels can acquire orthogonal linear fringes in two directions simultaneously.

It is preferable that the image sensor of the present invention further include signal read means for reading a signal determined by the amount of light received from each pixel in the row of pixels and signal processing means for calculating the positions of a bright part or a dark part of the linear fringe from the read signal, and that the signal processing means include a connection processing portion for connecting bright parts together or dark parts together of the orthogonal linear fringes in the two directions in accordance with a change in position of the bright parts or dark parts before and after a given period, in order to estimate a flat fringe image.

It is also preferable that the light receiving plane include a common pixel disposed at least at the intersection of the two rows of pixels. It is also preferable that the light receiving plane further include a plurality of pixels other than the pixels of the rows of pixels disposed around the common pixel.

As described above, the bright parts for dark parts) can be connected together easily and accurately by image processing based on the information of the common pixel. If a plurality of additional pixels are disposed around the common pixel, the connection processing can be performed more easily, and the reliability can be improved.

It is preferable that the light receiving plane include four or more straight rows of pixels, and four of the four or more rows of pixels be disposed along the four sides of an almost square shape.

With the four rows of pixels disposed along the four sides of the almost square shape, the common pixels can be provided at the four corners. By executing image processing based on the information of the common pixels, the fringe connection processing can be performed more easily, and the reliability can be improved further.

Attitude Detector

An attitude detector according to the present invention includes the image sensor and an interferometer for directing light onto a reflecting surface formed on an irradiated body and projecting interference fringes based on the reflected beam onto the image sensor, and detects a change in attitude of the irradiated body in accordance with a change in images of linear fringes in two directions acquired by the image sensor. More specifically, the interferometer can be a Michelson interferometer, a Fizeau interferometer, or another interferometer.

If the Michelson interferometer is adopted, it is preferable that the interferometer include a light source that emits a coherent beam, a beam splitter for splitting the beam coming from the light source, and a reference mirror for receiving one split beam; that another split beam coming from the beam splitter strike the reflecting surface of the irradiated body; and that the image sensor capture images of interference fringes produced by interference between the beam reflected from the reflecting surface of the irradiated body and the beam reflected from the reference mirror.

An attitude detector utilizing the above-described interferometer can detect the attitude of the irradiated body at the level of the optical wavelength. An example with an irradiated body held in three degrees of freedom, namely, translation in the Z-axis direction, rotation about the X axis, and rotation about the Y axis, will be described. If the density of vertical linear fringes does not change and the density of horizontal linear fringes changes in a fringe image, the irradiated body is judged to be rotated about the X axis. If the density of horizontal linear fringes does not change and the density of vertical linear fringes changes, the irradiated body is judged to be rotated about the Y axis. If the densities of vertical and horizontal linear fringes do not change and the fringes flow, the irradiated body is judged to be translated in the Z-axis direction. With these judgment criteria, the translation of the irradiated body in the direction of the optical axis of the irradiated beam (one degree of freedom) and rotation about two axes orthogonal to the optical axis (two degrees of freedom) can be detected at a high speed.

An attitude detector according to the present invention includes the image sensor and pattern projection means for projecting a regular fringe pattern onto a reflecting surface formed on an irradiated body; the pattern projection means includes a light source that emits a coherent beam and a projection element that is disposed in the optical path between the light source and the irradiated body, receives the coherent beam, and projects the fringe pattern onto the reflecting surface of the irradiated body; the image sensor is disposed at a position at which the beam reflected from the reflecting surface is received; and a change in attitude of the irradiated body is detected from a change in images of linear fringes in two directions acquired by the image sensor.

The image sensor can be used not only in an attitude detector using an interferometer but also in a system in which a fringe pattern projected by the pattern projection means is captured to detect the attitude of the irradiated body.

Contact Probe and Multi-sensing Probe

A contact probe according to the present invention includes the attitude detector; a housing containing the attitude detector; a movable portion that includes the irradiated body, a stylus that moves integrally with the irradiated body, and a contact portion that is mounted at the tip of the stylus and that approaches or comes into contact with a surface of an object under measurement; and a supporting portion provided in the housing to support the movable portion such that the attitude of the movable portion changes in accordance with the contact portion approaching to coming into contact with it; and the attitude detector quantitatively detects the displacement of the contact portion in three-dimensional coordinates, occurring when the contact portion receives an acting force from the surface of the object under measurement, by detecting a change in attitude of the movable portion.

A multi-sensing probe according to the present invention includes the movable portion of the contact probe, detachably mounted to the housing; and in a state in which the movable portion is detached from the housing, a reflecting surface formed on another object under measurement is disposed at the position where the reflecting surface of the movable portion was placed before detached, and a change in attitude of the object under measurement is detected.

Since the movable portion of the contact probe is detachably provided, the multi-sensing probe can function both as a contact probe and as an attitude sensor.

By using the attitude detector as an internal sensor of a contact probe mounted on a three-dimensional measuring device or as an external sensor of a multi-sensing probe for detecting a change in attitude of a critically aligned optical component in quasi-real-time and adjusting the attitude automatically, the contact probe or the multi-sensing probe can gain high functionality, such as high resolution, high stability, and fast response.

An image sensor for images of fringes, such as interference fringes, according to the present invention can be provided with a simpler optical structure than the conventional line image sensor and is capable of high-speed detection.

By detecting fringes formed by a beam reflected from a reflecting surface formed on an irradiated body by means of the image sensor, an attitude detector for detecting the attitude of the irradiated body can be provided with high functionality, such as high resolution, high stability, and fast response.

Further, a contact probe for three-dimensional measuring device incorporating the attitude detector as an internal sensor, and a multi-sensing probe can be provided.

DESCRIPTION OF THE PREFERRED EMBODIMENTS

Rectangular Line Image Sensor

Figure 1A:
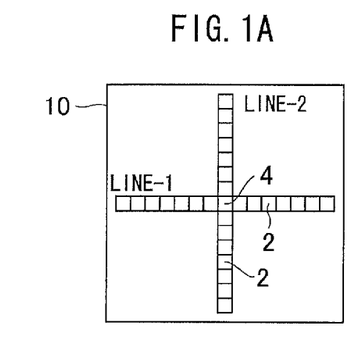
FIG. 1A is a diagram showing arrays of pixels in an image sensor according to a first embodiment of the present invention.
Figure 1B:
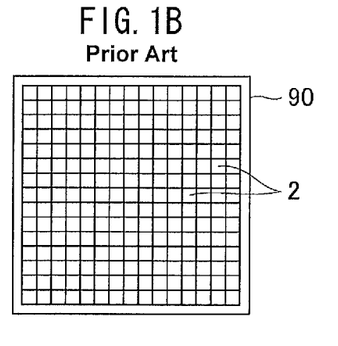
FIG. 1B is a diagram showing arrays of pixels in a conventional sensor for comparison.

An image sensor according to a first embodiment of the present invention will be described with reference to the drawings. FIG. 1A shows arrays of pixels 2 in an image sensor (imaging element) 10 according to the present invention. FIG. 1B shows a conventional CMOS or CCD area image sensor 90, for comparison.

The image sensor shown in FIG. 1A has a plurality of pixels 2, such as photodiodes (PDs), arranged in a cross shape. More precisely, a plurality of straight rows of pixels 2 (line image sensors) are disposed almost at right angles to each other. The two almost orthogonal rows (lines 1 and 2) of pixels capture fragments of a single fringe projected on a light receiving plane of the image sensor 10 and obtains images of linear fringes in two directions. The image sensor according to the present invention will also be referred to as a rectangular image sensor below.

If the numbers of pixels in the horizontal direction and the vertical direction in the image sensor 10 are the same as those in the conventional area image sensor 90 shown in FIG. 1B, the image sensor 10 has a much smaller number of pixels than the conventional area image sensor 90, meaning that the entire sensor can execute detection more quickly. In comparison with the conventional area image sensor having one million pixels, for example, the image sensor according to the present invention has about 2,000 pixels, consequently providing about 500-times higher detection speed. The frame rate of the image sensor 10 of the present invention, simply calculated from the general frame rate of 30 fps (sampling frequency of 30 Hz) of the conventional area image sensor 90, is 15,000 fps (or 15 images per second). General line image sensors have a detection speed of tens of thousands of lines per second (several tens of kilohertz), and the image sensor 10 of the present invention can offer a frame rate of 15,000, which is on the same order.

Whereas the object of the conventional area image sensor 90 is to sense the shape or image of the irradiated body, the object of the rectangular line image sensor 10 of the present invention is to sense a change in attitude (translation or rotation) of the irradiated body. Since the use is limited accordingly in order to capture images of regular fringes such as interference fringes, a high detection speed has been achieved.

A conventional PSD can obtain just two or four pieces of information in accordance with the number of split faces. The PSD detects the light receiving position in each split face quickly, but the detected position is the centroid of the distribution of light received in each split face. Therefore, the PSD is not suitable for accurately detecting the displacement of a bright part and a dark part caused by the movement of an interference fringe. In contrast, the image sensor 10 of the present invention normally has about 2,000 pixels and can accurately detect the displacement of the boundary between the bright part and the dark part caused by the movement of the interference fringe. Since the sensor can obtain information at 15,000 frames per second, the averaging effect generated in attitude detection due to a great amount of information reduces noise, allowing more accurate attitude information to be obtained.

Figure 2A:
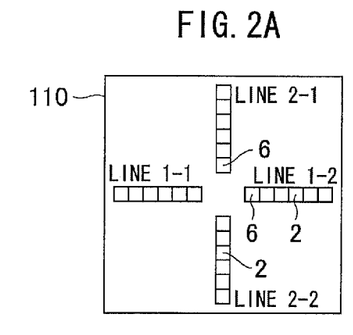
FIGS. 2A and 2B are diagrams showing variations to the arrays of pixels in an image sensor of a first embodiment.
Figure 2B:
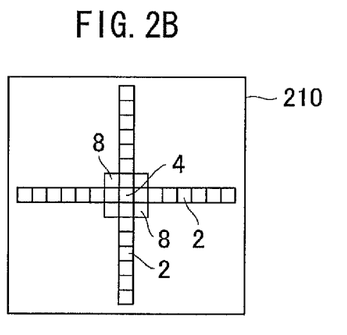

The configuration of the image sensor 10 is not limited to that shown in FIG. 1A, and configurations like those shown in FIGS. 2A and 2B are also possible. In FIG. 1A, the two rows of pixels (lines 1 and 2) cross each other, and a common pixel 4 is disposed at the intersection. In an image sensor 110 shown in FIG. 2A, no pixel is disposed at the position of the common pixel 4 and adjacent positions thereof. In other words, four rows of pixels (lines 1-1 to 2-2) are disposed radially at angular intervals of about 90 degrees. The image sensor 110 uses the rows of pixels independently. Since the sensor has no common pixel nor surrounding pixels, the image processing time can be shorter than that of the image sensor 10 shown in FIG. 1A.

An image sensor 210 shown in FIG. 2B has pixels 8 around the common pixel 4 shown in FIG. 1A. With the pixels 8 disposed adjacent to the common pixel 4 at four positions, outside the two rows of pixels (lines 1 and 2), the accuracy of the common information is improved.

Figure 3A:
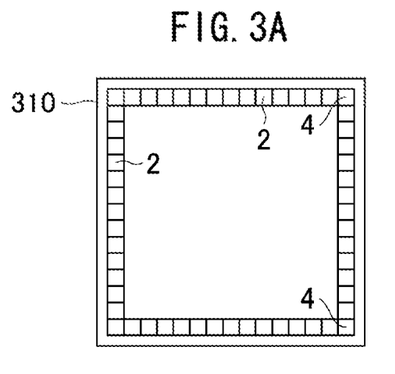
FIGS. 3A and 3B are diagrams showing other variations to the arrays of pixels in an image sensor of a first embodiment.

An image sensor 310 shown in FIG. 3A indicates that two rows of pixels (lines 1 and 2) crossing roughly in the center of the light receiving plane, as shown in FIG. 1A, are not an indispensable condition of the image sensor of the present invention. The image sensor 310 has four rows of pixels positioned like four sides of a square. In this configuration, since the four rows of pixels are disposed at the perimeter of the square, the pixels in the four corners of the square are common pixels 4. Since the image processing is based on the information obtained from the four common pixels 4, a fringe image can be captured with a higher resolution, in comparison with the sensor having just a single common pixel at its center, as shown in FIG. 1A.

Figure 3B:
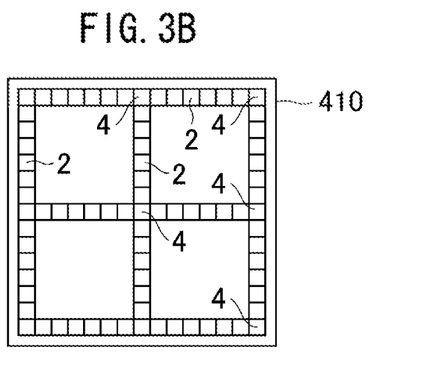

An image sensor 410 shown in FIG. 3B is a combination of two rows of pixels crossing each other, as shown in FIG. 1A, and four rows of pixels disposed like four sides of a square, as shown in FIG. 3A, and has the advantages of the two configurations. In addition, in this configuration, the pixels at both ends of the horizontal and vertical rows of pixels crossing each other and the pixels at the center of the rows of pixels disposed like the sides of a square are common pixels 4. With a total of nine common pixels 4 disposed at regular intervals, the fringe image can be captured efficiently with a higher resolution.

Unlike the line image sensor disclosed in Patent Literature 1, the image sensor of the present invention does not require a complicated optical configuration between the interferometer and the sensor. The image sensor can receive light of a fringe directly and can acquire two orthogonal linear fringes simultaneously by means of the horizontal row of pixels (line 1, for example) and the vertical row of pixels (line 2, for example).

In one application, when an interference fringe or a regular fringe pattern is captured, even if detailed information of the entire fringe is not obtained, because a change in the fringe can be estimated from fragmentary information of the fringe, a change in position or attitude of the irradiated body is detected from the estimated change in the fringe. The information of a linear fringe detected by the image sensor of the present invention at high speed can be useful information in attitude detection and other applications.

The image sensor of the present invention is not limited to the combination of rows of pixels described in this embodiment. The image sensor of the present invention needs to have a plurality of rows of pixels that includes at least two rows of pixels disposed almost at right angles to each other, each row of pixels being configured to capture the image of two linear fringes crossing almost at 90 degrees to each other, among the fringes projected onto the light receiving plane of the image sensor.

Attitude Detector

Figure 4:
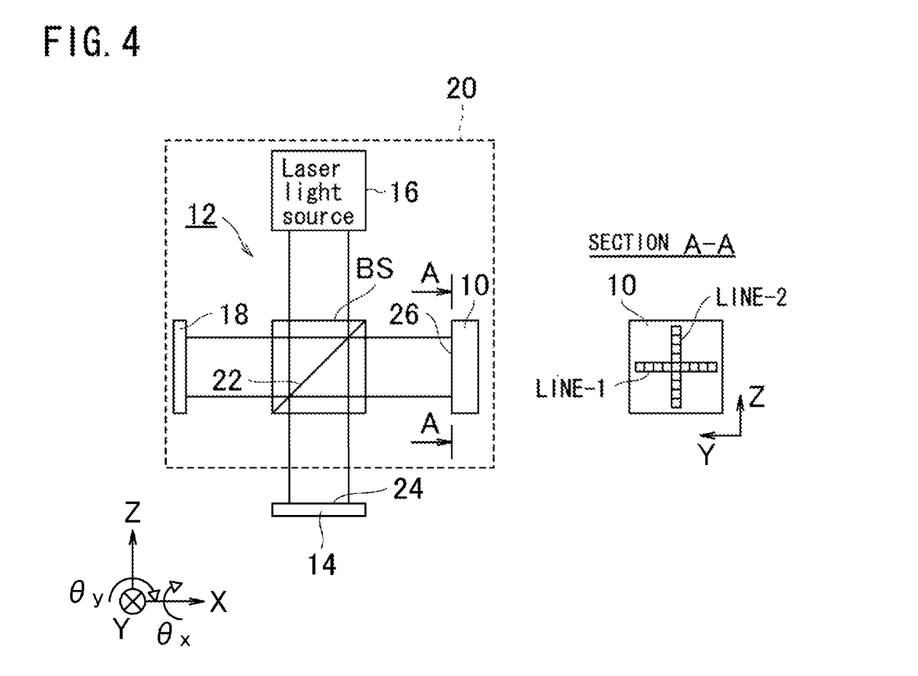
FIG. 4 is a diagram showing an optical configuration of an attitude detector according to a second embodiment of the present invention.

An attitude detector 20 according to a second embodiment of the present invention will be described next with reference to the drawings. FIG. 4 shows the configuration of the attitude detector 20 for detecting the attitude of an irradiated body 14 by using a Michelson interferometer 12. The rectangular image sensor 10, described earlier, is used as the imaging element for capturing images of interference fringes. The Michelson interferometer 12 includes a laser light source 16, a beam splitter (BS), and a reference mirror 18. The BS splits a coherent beam emitted from the laser light source 16. The coherent beam reflected by a translucent film 22 of the BS strikes the reference mirror 18, and the coherent beam transmitted through the translucent film 22 strikes the irradiated body 14. As shown in the figure, the optical axis of the measurement beam from the BS to the irradiated body 14 is the Z-axis.

A reflecting surface 24 almost orthogonal to the Z-axis is formed on the irradiated body 14 and reflects the coherent beam from the BS back to the BS. The attitude of the irradiated body 14 has three degrees of freedom, namely, translation in the Z-axis direction, rotation about the X-axis, and rotation about the Y-axis. The reference mirror 18 also reflects the coherent beam from the BS back to the BS.

In the BS, the beam reflected from the irradiated body 14 (measurement beam) is reflected by the translucent film 22, and the beam reflected from the reference mirror 18 (reference beam) is transmitted through the translucent film 22. The beams interfere with each other to project interference fringes onto the light receiving plane 26 of the image sensor 10 disposed on the optical axis.

As described above, the attitude detector 20 has a simple optical configuration and mainly includes the laser light source 16, the BS, the reference mirror 18, and the image sensor 10.

If the BS is a polarization beam splitter (PBS) and if a half-wave plate ($\lambda/2$) is placed between the PBS and the reference mirror 18 and between the PBS and the irradiated body 14, the light recovery efficiency can be improved, and the occurrence of ghost fringes can be suppressed.

Since the rectangular line image sensor 10 according to the preceding embodiment, which can detect linear fringes in two orthogonal directions quickly, is used as an imaging element for interference fringes, the response from when an attitude information acquisition command is issued until actual attitude information is acquired is high, and the attitude of the irradiated body 14 having three degrees of freedom can be detected quickly. The attitude detector of the present invention is also referred to as a three-degrees-of-freedom sensor.

The image sensor 10 used in the attitude detector 20 includes signal reading means for reading an illuminance signal corresponding to the amount of light received from each pixel 2 in a plurality of rows of pixels (lines 1 and 2) and signal processing means for calculating the position of a bright part (or a dark part) of a linear fringe from the read illuminance signal. As the signal reading means, an existing CCD or CMOS component and the like can be used. As the signal processing means, an arithmetic circuit such as a CPU configured separately from or integrally with the signal reading means can be used.

The signal processing means includes a connection processor for connecting bright parts (or dark parts) of linear fringes in two directions in accordance with a change in position of a bright part (dark part) before and after a given time, in order to estimate a flat fringe image. The number of pixels in a single row of pixels in the image sensor 10 is determined to acquire a sufficient amount of information for calculating cyclic changes in linear fringes by Fourier transformation. The minimum number of pixels is four.

Example of Detection Method

One example method of detecting the attitude of the irradiated body 14 based on the image of linear fringes in two orthogonal directions will be described with reference to FIGS. 5 to 8. The relationship between a change in attitude of the irradiated body 14 and a change in interference fringes will be described first with reference to FIG. 5. The figure shows how the interference image projected onto the light receiving plane of the image sensor 10 changes when the irradiated body 14 is rotated about the Y-axis.

Figure 5:
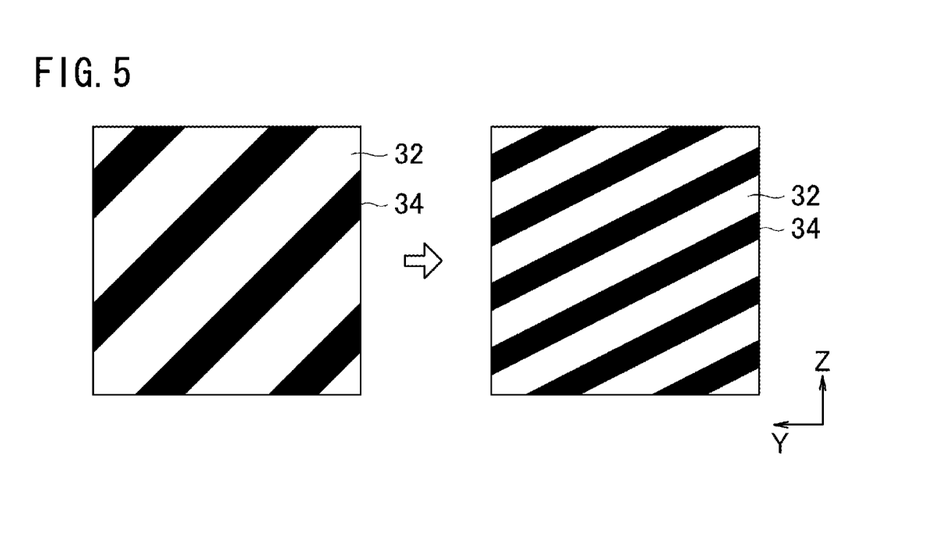
FIG. 5 is a diagram illustrating how an interference fringe changes when an irradiated body is rotated about the Y-axis.

In the initial state of the irradiated body 14, the attitude of the reference mirror 18 is adjusted so that bright bands 32 (or dark bands 34) of the interference fringes shown in the left drawing of FIG. 5 extend in the 45-degree direction. The initial state of interference fringes is not confined especially, but the initial state as shown in the left drawing of FIG. 5 is preferable for efficient detection of changes in attitude of the irradiated body 14. By reducing the number of bright bands 32 in the interference fringes projected onto the light receiving plane 26, the resolution of a single bright band 32 can be improved, and the accuracy of attitude detection can be improved. The actual attitude of the reference mirror 18 is adjusted to provide the most suitable number of bright bands 32 in accordance with the number of pixels of the image sensor 10 and the three-degrees-of-freedom attitude detection range. When the irradiated body 14 is rotated about the Y-axis, the inclination of the bright bands 32 in the interference fringes is reduced, as shown in the right drawing of FIG. 5, and the space between the bright bands 32 decreases, increasing the number of projected bright bands 32.

Figure 6:
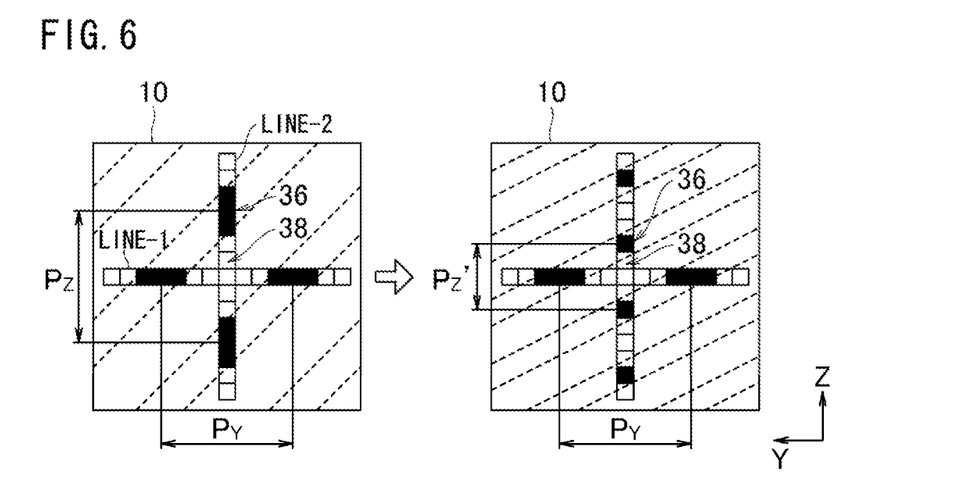
FIG. 6 is a diagram illustrating how linear fringes on the attitude detector change when an irradiated body is rotated about the Y-axis.

Changes in linear fringes captured by the image sensor 10 of the present invention will be described next with reference to FIG. 6. The figure corresponds to FIG. 5 and shows the images of the linear fringes captured by the image sensor 10 before and after the attitude changes. In the initial state, the number of included dark parts 36 (or bright parts 38) and their positions, as shown in the left drawing of FIG. 6, are detected from the information of the vertical row of pixels (line 2). In the same way, the number of included dark parts 36 and their positions are detected from the information of the horizontal row of pixels (line 1). The numbers of dark parts 36 (or bright parts 38) included in each of the vertical and horizontal rows of pixels (lines 1 and 2) are also referred to as the densities of linear fringes in the rows of pixels.

In comparison with the image before the change, the two linear fringes after the attitude change shown in the right drawing of FIG. 6 have the same horizontal pitch $P_Y$ between the dark parts 36, and the vertical pitch between the dark parts 36 is reduced from $P_Z$ to $P_Z'$. It is found that the horizontal density of linear fringes does not change, whereas the vertical density of linear fringes has increased.

The figure shows the pixels in black and white for the sake of simplicity but the signal of a single pixel taken from an element such as a photodiode would include illuminance information. By performing image processing based on changes in illuminance of each pixel, the positions and density of linear fringes can be acquired more accurately. Even if the dark parts 36 and bright parts 38 cannot be distinguished clearly unlike in the figure, the position information can be accurately obtained on the basis of the illuminance information.

Accordingly, if only the vertical density (pitch $P_Z$) of linear fringes changes, it can be determined that the irradiated body 14 has rotated about the Y-axis. The degree of change in density can be obtained as the angular displacement. If only the horizontal density (pitch $P_Y$) of linear fringes changes, it can be determined that the irradiated body 14 has rotated about the X-axis and its attitude has changed.

Figure 7:
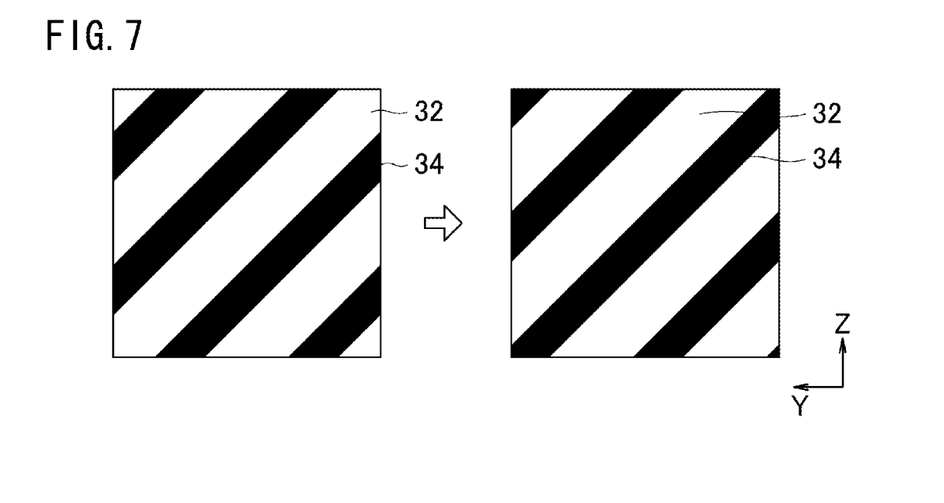
FIG. 7 is a diagram illustrating how an interference fringe changes when an irradiated body moves in the direction of the Z-axis.
Figure 8:
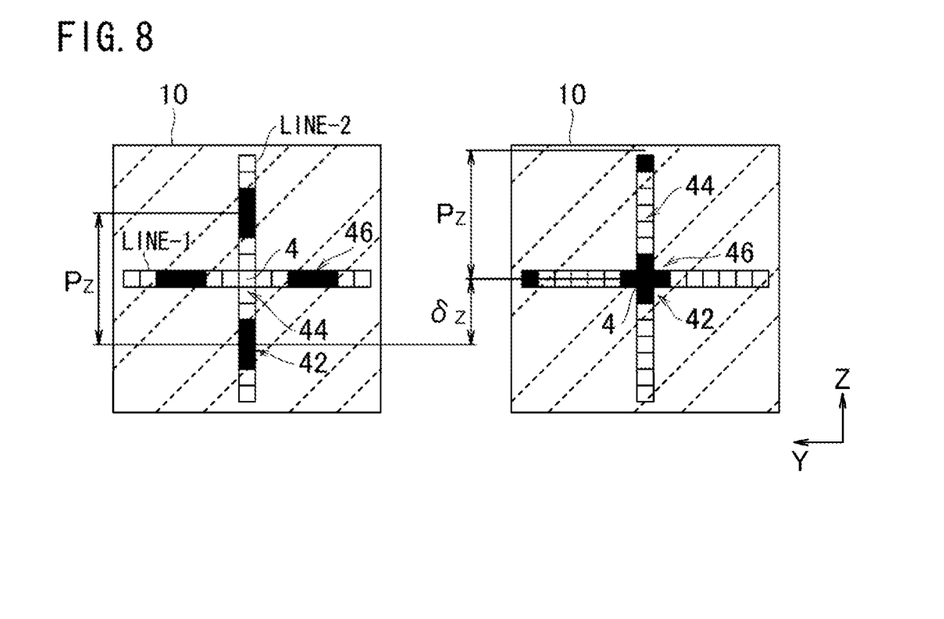
FIG. 8 is a diagram illustrating how linear fringes on the attitude detector change when an irradiated body moves in the direction of the Z-axis.

If the irradiated body 14 moves in the direction of the Z-axis, the number of bright bands 32 (or dark bands 34) of the interference fringes projected as shown in FIG. 7 does not change, but all the bright bands 32 are translated in the same direction. This type of change in fringes is referred to as a flow of fringes. FIG. 8 corresponds to FIG. 7 and shows images of linear fringes, captured by the image sensor 10 before and after the attitude changes. If the change occurs just in the Z-axis direction, the vertical and horizontal densities of linear fringes do not change. The pitches $P_Z$ and $P_Y$ of the bright parts (or dark parts) of the linear fringes do not change, but the positions of the bright parts (or dark parts) change. FIG. 8 shows that the position of a specific vertical dark part 42 (or a specific vertical bright part 44) changes by $\delta_Z$ in the vertical direction. The amount of change in position of the dark part 42 is referred to as the amount of change in phase of the linear fringe.

The figure also shows that the position of a specific dark part 46 changes by $\delta_Z$ in the horizontal direction. As the attitude changes, the specific dark part 42 and the specific dark part 46 move in the vertical direction and the horizontal direction, respectively, and meet at the common pixel 4, as shown in the right drawing of the figure. According to the information obtained from the common pixel 4, it is clearly understood that the two dark parts 42 and 46 are connected as a single dark band.

A given change in attitude of the irradiated body 14 in the three degrees of freedom is indicated by a combination of changes in density and position (phase) of linear fringes in the vertical and horizontal directions, as described above. The density of linear fringes in line 1 of the image sensor 10 corresponds to rotation about the X-axis, and the phase of the linear fringes corresponds to translation in the Z-axis direction. In the same manner, the density of linear fringes in line 2 corresponds to rotation about the Y-axis, and the phase of the linear fringes corresponds to translation in the Z-axis direction. Therefore, a change in attitude of the irradiated body can be calculated in three degrees of freedom, one being the Z-axis translation and two being rotation about the X-axis and Y-axis.

Since both the phase of line 1 and the phase of line 2 correspond to translation in the Z-axis direction, the translation in the Z-axis direction may be obtained as either of the two values or the average of the two.

With at least two rows of pixels (lines 1 and 2) disposed in the vertical and horizontal directions for a single interference fringe, the attitude detector 20 in this embodiment can detect a change in the fringe more accurately than a detector having a single row of pixels in one direction.

When two or more rows of pixels (lines 1 and 2) are used, a change in a fringe can be accurately detected through estimation of the entire image of the fringe by connecting a bright part (or a dark part) of a given order in one row of pixels (line 1) and a bright part (or a dark part) of the same order in another row of pixels (line 2). More specifically, if the two rows of pixels cross each other as in the image sensor 10 in this embodiment, the common pixel 4 is present at the intersection. If the rows of pixels do not cross each other as in the image sensor 110 shown in FIG. 2A, the rows of pixels (lines 1-1 to 2-2) have pixels 6 in the positions closest to the other rows of pixels. By performing image processing based on information taken from the pixel 4 shared by the two rows of pixels or the pixels 6 in the closest positions, the bright parts (or dark parts) can be connected easily and accurately.

The attitude detector 20 in this embodiment described above has three degrees of freedom and uses the Michelson interferometer 12, but the interferometer is not limited to the one described here. The attitude detector may use a different type of interferometer such as a Fizeau interferometer. The light source 16 is not limited to the one that emits light of a single wavelength such as a laser beam and may emit light having a plurality of wavelengths and may emit white light. In the latter case, the translation in the Z-axis direction can be detected as an absolute value.

Attitude Detector

Figure 9:
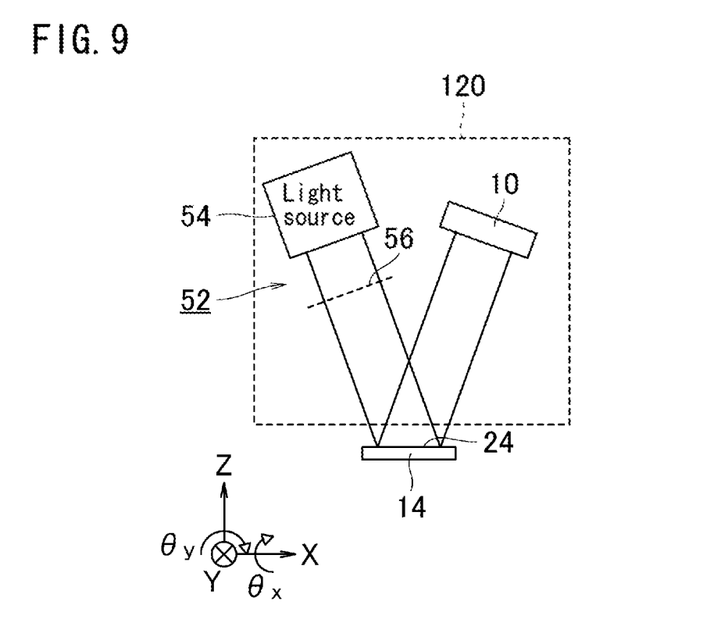
FIG. 9 is a diagram showing an optical configuration of an attitude detector according to a third embodiment of the present invention.

An attitude detector according to a third embodiment of the present invention will be described with reference to the drawings. FIG. 9 shows the optical configuration of an attitude detector 120 for detecting the attitude of the irradiated body 14 in three degrees of freedom, by using grating projection means 52 (a light source 54 and a master grating 56).

Light coming from the light source 54 hits the master grating 56, and the grating pattern (fringe pattern) is projected onto a reflecting surface 24 formed on the irradiated body 14. The projected fringe pattern is captured by the rectangular line image sensor 10.

The attitude detector 120 in this embodiment can be configured simply by the light source 54, the master grating 56, and the image sensor 10. Since the rectangular line image sensor 10 is used as in the second embodiment, the response is high.

The attitude detector 120 is based on the technologies of three-dimensional geometry measurement of an object by the so-called pattern projection method. By using the rectangular line image sensor 10 of the present invention specifically for detecting the attitude of the irradiated body 14, the attitude detector 120 has a high response as in the preceding embodiment.

A detection method used in the attitude detector 120 in this embodiment will be described briefly. As the distance between the light source 54 or the master grating 56 and the reflecting surface 24 of the irradiated body 14 increases, the bright bands of the grating pattern projected onto the reflecting surface 24 become wider. Conversely, as the distance decreases, the bright bands of the grating pattern become narrower. If the image sensor 110 having four rows of pixels (lines 1-1 to 2-2) shown in FIG. 2A is used as the imaging element, a change in attitude of the irradiated body 14 in three degrees of freedom, namely, translation in one direction and rotation in two directions, can be calculated as in the second embodiment. The rows of pixels are called segments 1-1, 1-2, 2-1, and 2-2. The numbers of bright parts (or dark parts) of a linear fringe included in the segments 1-1 to 2-2 are $N_{1\text{-}1}$, $N_{1\text{-}2}$, $N_{2\text{-}1}$, and $N_{2\text{-}2}$, respectively. The distance between the centers of segments 1-1 and 1-2 is $L_1$, and the distance between the centers of segments 2-1 and 2-2 is $L_2$. Then, the rotation about the X-axis corresponds to $(N_{1\text{-}1}-N_{1\text{-}2})/L_1$, and the rotation about the Y-axis corresponds to $(N_{2\text{-}1}-N_{2\text{-}2})/L_2$. The translation in the Z-axis direction corresponds to $N_{1\text{-}1}+N_{1\text{-}2}+N_{2\text{-}1}+N_{2\text{-}2}$. In this embodiment, a change in attitude of the irradiated body can be calculated in three degrees of freedom, one being the Z-axis translation and two being rotation about the X-axis and Y-axis as in the second embodiment.

The grating pattern is projected in this embodiment, but the projected pattern may be different. The attitude detector may have another master pattern between the light source 54 and the irradiated body 14 or between the irradiated body 14 and the image sensor 10, and a moiré pattern produced by interference between the two patterns may be captured by the rectangular line image sensor 10 of the present invention. For the linear fringes in two directions captured by the image sensor in the present invention, it is preferable that the grating pattern have bright parts alternating with dark parts with some regularity.

The attitude detector 20 (FIG. 4) in the second embodiment is useful for high-sensitivity attitude detection, whereas the attitude detector 120 (FIG. 9) in this embodiment is useful when a large change in attitude is expected or when the reflecting surface 24 of the irradiated body 14 is rough.

Contact Probe and Multi-sensing Probe

Figure 10:
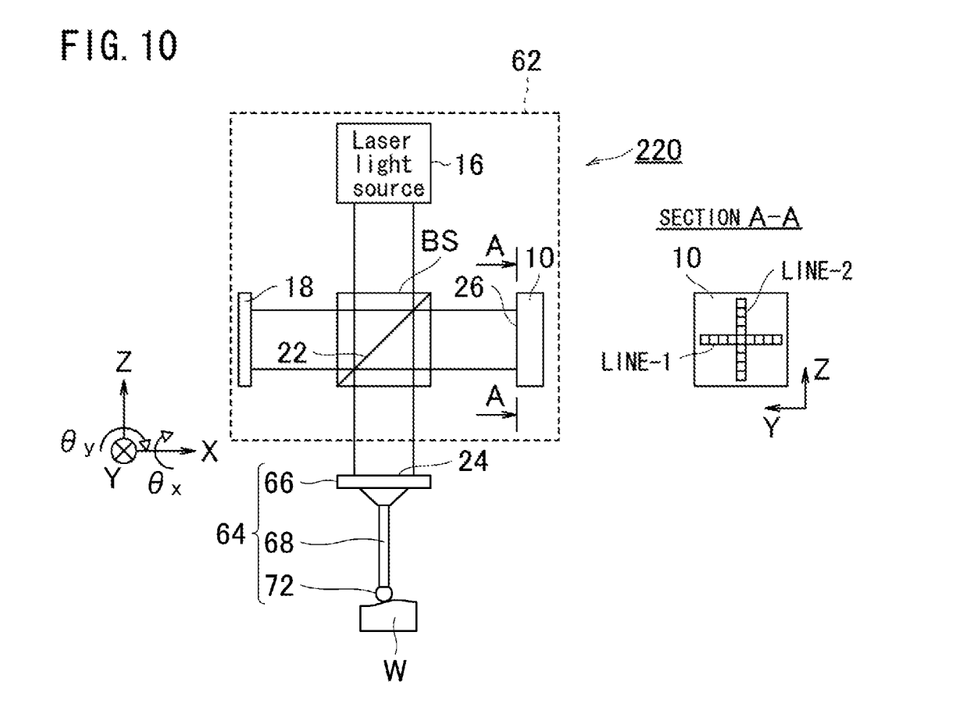
FIG. 10 is a diagram showing an optical configuration of a contact probe according to a fourth embodiment of the present invention.

A contact probe 220 and a multi-sensing probe 320 according to a fourth embodiment of the present invention will be described with reference to the drawings. FIG. 10 shows the contact probe 220 that uses the attitude detector 20 shown in FIG. 4 as an internal sensor.

The contact probe 220 includes the attitude detector 20 in a housing 62 of the probe body. The configuration of the attitude detector 20 is the same as described in the second embodiment. The object to be sensed by the attitude detector 20 is a movable portion 64 placed beforehand below the attitude detector 20. The movable portion 64 is supported by a support, not shown in the figure, provided in the housing 62 such that it can move relatively with respect to the attitude detector 20.

The movable portion 64 includes an irradiated body 66, a stylus 68 that moves together with the irradiated body 66, and a contact portion 72 that is mounted at the tip of the stylus 68 to approach or to come into contact with the surface of an object under measurement W. The support, not shown, supports the movable portion 64 such that the attitude of the movable portion 64 changes freely in accordance with the contact portion 72 approaching or coming into contact with the surface of the object under measurement W. The movable portion 64 has three degrees of freedom in motion, which are rotation about the X axis and the Y axis and translation in the Z-axis direction, as in the detection method used by the attitude detector shown in FIG. 4.

In the contact probe 220, the internal attitude detector 20 detects a change in attitude of the movable portion 64, and consequently, when the contact portion 72 attached to the stylus 68 receives an acting force from the surface of the object under measurement W, the displacement of the contact portion 72 in three-dimensional coordinates can be detected in a quantitative form.

The attitude detector 20 detects a change in attitude or the attitude of the movable portion 64 changing when the contact portion 72 attached to the stylus 68, which is a part of the movable portion 64, approaches or comes into contact with the object under measurement W. The probe having this type of attitude detection function is called a contact probe. If the length of the stylus 68 and the shape of the contact portion 72 are known, the contact probe 220 can identify the three-dimensional position of the contact portion 72 from the attitude of the movable portion 64. According to this embodiment, the contact probe 220 has high speed, high precision, a very simple structure.

FIG. 10 shows the contact probe 220 as an example. If the top face of the movable portion 64 is polyhedral, the attitude of the movable portion 64 can be detected in six degrees of freedom, for example. If the movable portion 64 shown in FIG. 10 is detachable from the attitude detector 20, a multi-sensing probe that can use the attitude detector 20 as both an external sensor and an internal sensor can be implemented.

Figure 11:
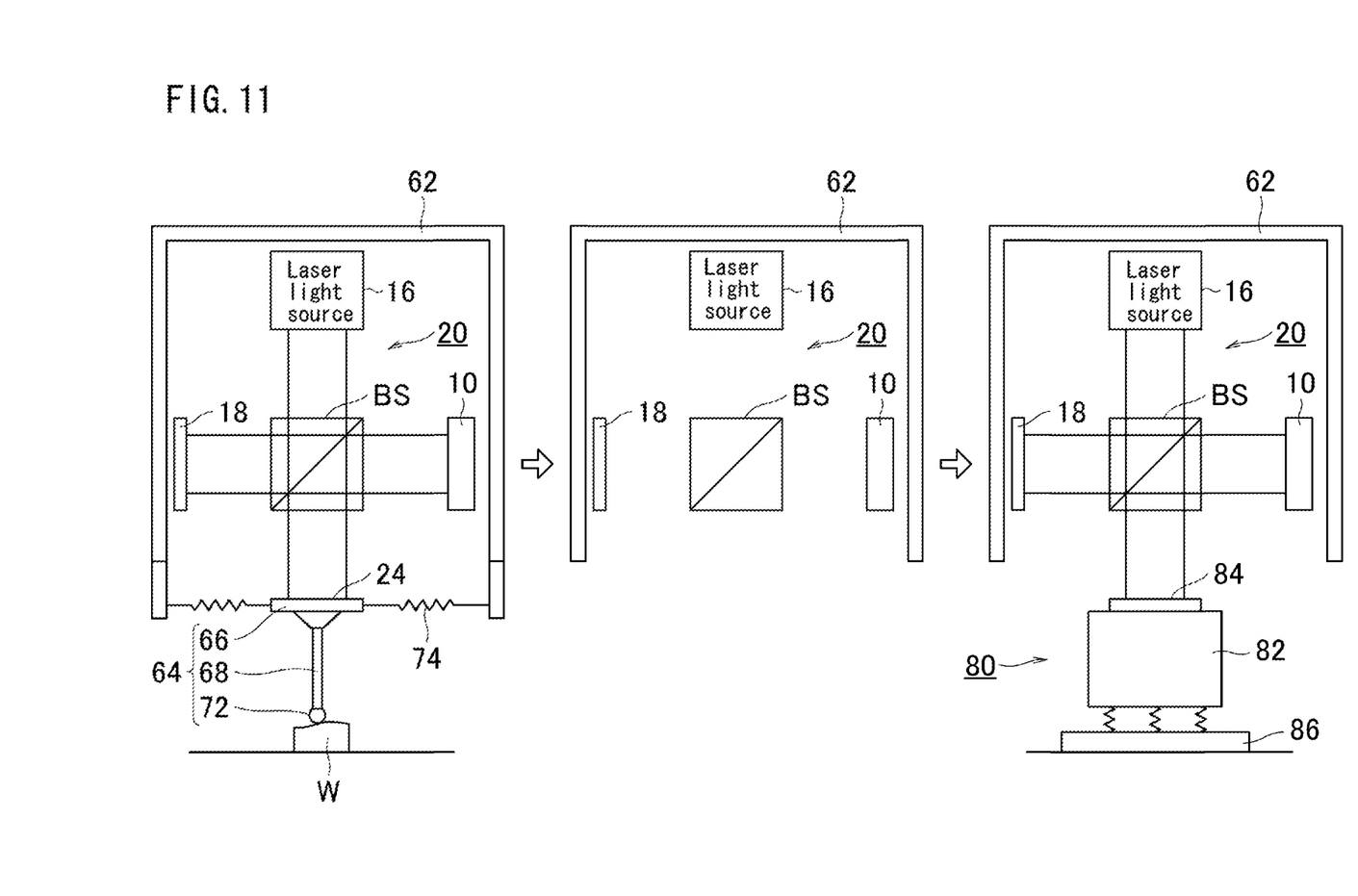
FIG. 11 is a diagram showing an optical configuration of a multi-sensing probe according to a fifth embodiment of the present invention.

FIG. 11 shows a multi-sensing probe 320. A detachable supporting portion 74 is disposed at the bottom of the housing 62 of the contact probe 220. The movable portion 64 is supported by the supporting portion 74 so as to have three degrees of freedom in its attitude. As shown in the left drawing in FIG. 11, when the movable portion 64 is mounted with the supporting portion 74, the function of the contact probe 220 in FIG. 10 can be executed.

As shown in the middle drawing in FIG. 11, by removing the movable portion 64 and the supporting portion 74 together from the housing 62, a function of detecting the attitude of another object under measurement 80 can be executed, as shown in the right drawing. The object under measurement 80 has a movable portion 82 supported to have three degrees of freedom in its attitude with respect to a base 86, and a reflecting surface 84 is formed on top of the movable portion 82. By placing the reflecting surface 84 in the same position as a reflecting surface 24 of the movable portion 64, the attitude of the movable portion 82 can be detected quickly with high precision.

DESCRIPTION OF REFERENCE NUMBERS

2 Pixel
4 Common pixel
10, 110, 210, 310, 410 Image sensor
12 Interferometer (Michelson interferometer)
14, 66 Irradiated body
16 Laser light source
18 Reference mirror
20, 120 Attitude detector
24, 84 Reflecting surface
36 Dark parts of linear fringe
38 Bright parts of linear fringe
52 Grating projection means (Pattern projection means)
54 Light source
56 Master grating (Projection element)
62 Housing
64 Movable portion
68 Stylus
72 Contact portion
74 Supporting portion
80 Object under measurement
220 Contact probe
320 Multi-sensing probe

What is claimed is:

1. A line image sensor including:
a light receiving plane which comprises only two straight rows of pixels disposed at right angles to each other,
said two straight rows of pixels capturing images of regular fringes generated from light reflected from an irradiated body as images of linear fringes which have bright parts alternated with dark parts in accordance with an amount of light received by each pixel of the two straight rows of pixels,
signal read means for reading a signal determined by an amount of light received from each pixel in the two straight rows of pixels,
signal processing means for calculating positions of the bright parts or the dark parts of the linear fringes from the read signal by the signal read means,
said line image sensor detecting a change in attitude of the irradiated body in accordance with the images captured by the two straight rows of pixels,
said light receiving plane acquiring images of linear fringes crossing at right angles in two directions among the regular fringe projected onto the light receiving plane, and
said signal processing means including a connection processing portion for connecting bright parts together or dark parts together of the linear fringes in the two directions in accordance with a change in position of the bright parts or dark parts before and after a given period, in order to estimate a flat fringe image.

2. A line image sensor according to claim 1, wherein the light receiving plane includes a common pixel disposed at least at the intersection of the two straight rows of pixels.

3. A line image sensor according to claim 2, wherein the light receiving plane further includes another plurality of pixels disposed at positions other than positions of the two straight rows of pixels, and disposed around the common pixel.

4. A line image sensor according to claim 1, wherein the light receiving plane includes other two straight rows of pixels added to the two straight rows of pixels,
wherein the four straight rows of pixels are disposed along the four sides of square shape.

5. An attitude detector including:
a line image sensor according to claim 1; and
an interferometer for directing light onto a reflecting surface formed on an irradiated body and projecting interference fringes based on the reflected beam onto the line image sensor, and
wherein the attitude detector detects a change in attitude of the irradiated body in accordance with a change in images of linear fringes in two directions acquired by the line image sensor.

6. An attitude detector according to claim 5,
wherein the interferometer includes a light source that emits a coherent beam, a beam splitter for splitting the coherent beam coming from the light source, and a reference mirror for receiving one split beam;
wherein another split beam coming from the beam splitter strikes the reflecting surface of the irradiated body; and
wherein the line image sensor captures images of interference fringes produced by interference between the beam reflected from the reflecting surface of the irradiated body and the beam reflected from the reference mirror.

7. An attitude detector including:
a line image sensor according to claim 1; and
pattern projection means for projecting a regular fringe pattern onto a reflecting surface formed on an irradiated body,
wherein the pattern projection means includes
a light source that emits a coherent beam and
a projection element that is disposed in the optical path between the light source and the irradiated body, receives the coherent beam, and projects the regular fringe pattern onto the reflecting surface of the irradiated body,
wherein the line image sensor is disposed at a position at which the beam reflected from the reflecting surface is received, and wherein the attitude detector detects a change in attitude of the irradiated body from a change in images of linear fringes in two directions acquired by the line image sensor.

8. A contact probe including:
an attitude detector according to claim 5;
a housing containing the attitude detector;
a movable portion that includes the irradiated body, a stylus that moves integrally with the irradiated body, and a contact portion that is mounted at a tip of the stylus and that approaches or comes into contact with a surface of an object under measurement; and
a supporting portion provided in the housing to support the movable portion such that the attitude of the movable portion changes in accordance with the contact portion approaching or coming into contact with the surface of the object under measurement; and
wherein the attitude detector quantitatively detects the displacement of the contact portion in three-dimensional coordinates, occurring when the contact portion receives an acting force from the surface of the object under measurement, by detecting a change in attitude of the movable portion.

9. A method of using a contact probe as a multi-sensing probe, comprising the steps of:
providing the contact probe according to claim 8,
providing the movable portion of the contact probe detachably mounted to the housing,
detaching the movable portion from the housing,
disposing a reflecting surface formed on an object under measurement at a position where a reflecting surface formed on the irradiated body of the movable portion is detached from the housing, and
detecting a change in attitude of the object under measurement.

* * * * *